(12) United States Patent
Koike

(10) Patent No.: US 6,621,920 B1
(45) Date of Patent: Sep. 16, 2003

(54) PRINT PATTERN RECOGNITION APPARATUS, RECOGNITION METHOD, AND INFORMATION STORAGE MEDIUM

(75) Inventor: Toshiaki Koike, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/493,699

(22) Filed: Jan. 28, 2000

(30) Foreign Application Priority Data

Dec. 10, 1999 (JP) .......................................... 11-351957

(51) Int. Cl.⁷ ................................................ G06K 9/00
(52) U.S. Cl. ......................................... 382/139; 702/66
(58) Field of Search ................................. 382/139, 137, 382/140, 280, 101, 177; 702/66; 235/462.3; 358/1.14; 324/212

(56) References Cited

U.S. PATENT DOCUMENTS

| | | |
|---|---|---|
| 3,949,363 A | 4/1976 | Holm |
| 4,408,342 A | 10/1983 | Grabowski et al. |
| 4,817,176 A * | 3/1989 | Marshall et al. ............ 382/280 |
| 5,134,663 A | 7/1992 | Kozlowski |
| 5,200,567 A * | 4/1993 | Minamitaka et al. ......... 84/627 |
| 5,671,291 A | 9/1997 | Ruault et al. |
| 5,917,931 A | 6/1999 | Kunkler |
| 6,249,604 B1 * | 6/2001 | Huttenlocher et al. ...... 382/174 |
| 6,327,543 B1 * | 12/2001 | Nakajima et al. ............. 702/66 |
| 6,433,896 B1 * | 8/2002 | Ueda et al. .................. 358/488 |

FOREIGN PATENT DOCUMENTS

| | | |
|---|---|---|
| JP | 62-143584 | 6/1987 |
| JP | 63-192168 | 8/1988 |
| JP | 3-166799 | 7/1991 |

* cited by examiner

*Primary Examiner*—Bhavesh M. Mehta
*Assistant Examiner*—Barry Choobin

(57) ABSTRACT

A print pattern recognition apparatus includes a storage unit which stores a plurality of signal waveform data, which is extracted according to a predetermined condition from standard read signal waveform data and which is associated with a plurality of corresponding standard MICR characters, a detector unit for reading the MICR characters printed on a recording medium to output read signal data, a comparator unit for comparing the read signal data output from the detector unit with the signal waveform data stored in the storage unit, and a recognition unit for recognizing the characters and symbols printed on the recording medium in accordance with a comparison result provided by the comparator unit.

18 Claims, 7 Drawing Sheets

(a)

(b)

PRINT PATTERN RECOGNITION APPARATUS, RECOGNITION METHOD, AND INFORMATION STORAGE MEDIUM

BACKGROUND OF THE INVENTION

1. Field of the Invention

The present invention relates to a magnetic pattern recognition apparatus and method, and to a computer-readable information storage medium storing a program for recognizing a magnetic pattern. More specifically, the present invention relates to a magnetic pattern recognition apparatus and a method for recognizing MICR (Magnetic Ink Character Recognition) characters and symbols (hereinafter collectively referred to as "MICR characters") which are printed at a variety of accuracy levels using magnetic ink, and to a computer-readable information storage medium which stores a program for recognizing the MICR characters.

2. Description of the Related Art

Magnetic pattern recognition apparatuses have been conventionally used to recognize an MICR character that is printed on a personal check. FIG. 7 shows an example of MICR characters printed on a personal check. A series of characters "symbol 012345678 symbol space 9012 symbol 3456789 symbol space 0123 space symbol 4567890123 symbol" appearing at the bottom portion of the personal check shown in FIG. 7 are samples of printed MICR characters.

The MICR characters are standardized by CMC7 Specification, ANSI (American National Standards Institute) X9.27-1995, ISO (International Standard Organization) 1004 Information Processing Magnetic Ink Character Recognition—Print Specifications, and JIS (Japanese Industrial Standards) E13B, which are incorporated herein by reference in their entirety. The CMC7 Specification and E13B Specification standardize the fonts and magnetic characteristics of MICR characters, particularly theoretical output waveforms thereof, i.e., ideal waveform of changes in magnetic flux, when the MICR characters are read by magnetic head scanning.

A toner containing magnetic ink powders for printing the MICR characters is available for use in laser printers. Similar ink is also available for use in ink-jet printers and thermal transfer printers. Using such a toner and ink, users can print the MICR characters on a personal check sheet using a low-cost commercially available printer.

Although the MICR characters have been printed using a dedicated printing apparatus having an accuracy level meeting a predetermined specification, the MICR characters are currently printed on low-cost commercially available printers at a variety of recording densities (i.e., dots per inch).

The printing and recognition techniques of the MICR characters will become further widespread in use, and techniques relating to the printing and recognition of the MICR characters will become even more important.

When the MICR characters are printed on commercially available printers of variety of recording densities, the following problems arise.

A difference in the recording density causes a variation in, for example, the thickness of a segment forming an MICR character even within a permissible range specified by the MICR character standards, thereby causing a drop in recognition accuracy.

The spacing between two adjacent MICR characters also suffers from variations due to the variations in the recording densities of the printers, thereby degrading recognition accuracy.

OBJECTS OF THE INVENTION

Therefore, it is an object of the present invention to overcome the aforementioned problems.

Accordingly, it is an object of the present invention to provide a magnetic pattern recognition apparatus and method for achieving a high recognition rate in the recognition of the MICR characters printed by a variety of printers of variety of recording densities, and to provide a computer-readable information storage medium which stores a program for carrying out accurate character recognition.

SUMMARY OF THE INVENTION

Accordingly, it is an object of the present invention to provide a magnetic pattern recognition apparatus and method for achieving a high recognition rate in the recognition of the MICR characters printed by a variety of printers of variety of recording densities, and to provide a computer-readable information storage medium which stores a program for carrying out accurate character recognition.

In order to achieve the above objects, a print pattern recognition apparatus of the present invention comprises: a storage which stores a plurality of signal waveform data extracted according to a predetermined condition from reference read signal waveform data corresponding to each of a plurality of standard print patterns, the storage storing the plurality of signal waveform data associated with the corresponding print patterns; a detector for reading each of print patterns printed on a recording medium to output read signal data; a comparator for comparing the read signal data output from the detector with the signal waveform data stored in the storage; and a recognition unit for recognizing the print patterns printed on the recording medium in accordance with a comparison result provided by the comparator.

In one embodiment of the present invention, the comparator comprises a sum-of-squared-differences calculator for calculating a assessment value corresponding to the sum of squared differences between the signal waveform data stored in the storage and the read signal data each corresponding to each of the signal waveform data, and the recognition unit determines as a recognition result a print pattern which has the minimum assessment value calculated by the sum-of-squared-differences calculator.

In a further embodiment of the present invention, the sum-of-squared-differences calculator comprises a data shifter for shifting the read signal data along a time axis, and the sum-of-squared-differences calculator sums the squared differences with the read signal data shifted by the data shifter associated with the corresponding signal waveform data.

In another embodiment of the present invention, the sum-of-squared-differences calculator further comprises a minimum value detector which determines the minimum one of a plurality of assessment values each calculated using the read signal data shifted by the data shifter by a respective shift amount which is different from each other, and the sum-of-squared-differences calculator output the minimum value determined by the minimum value detector as a calculation result.

In another embodiment of the present invention, the predetermined condition, according to which the plurality of signal waveform data is extracted from the reference read signal waveform data, includes at least one of a maximum point, a minimum point, and a zero-crossing point.

In another embodiment of the present invention, the plurality of standard print patterns are defined by one of the CMC7 Specification and the E13B Specification.

A method of the present invention for recognizing a print pattern comprises the steps of: (a) reading each of print patterns printed on a recording medium to output read signal data; (b) retrieving from a storage signal waveform data extracted according to a predetermined condition from reference read signal waveform data corresponding to a standard print pattern; (c) comparing the read signal data output in step (a) with the signal waveform data retrieved from the storage in step (b); and (d) recognizing the print patterns printed on the recording medium in accordance with a comparison result provided in step (c).

In one embodiment of the present invention, step (c) comprises the step of (e) calculating an assessment value corresponding to a sum of squared differences between the signal waveform data retrieved from the storage and the read signal data each corresponding to each of the signal waveform data, and step (d) comprises the step of (f) determining as a recognition result a print pattern which has the minimum assessment value calculated in step (e).

In a further embodiment of the present invention, step (e) comprises the steps of: (g) shifting the read signal data along a time axis; and (h) summing the squared differences calculated with the read signal data shifted in step (g) associated with the corresponding signal waveform data.

In still a further embodiment of the present invention, step (e) further comprises the steps of: (i) calculating a plurality of assessment values using the read signal data shifted in step (g) by a respective shift amount which is different from each other; (j) determining the minimum one of the plurality of assessment values; and (k) outputting the minimum value determined in step (j) as a calculation result.

In another embodiment of the present invention, step (e) further comprises the steps of: (l) calculating a plurality of squared differences using the read signal data shifted in step (g) by a respective shift amount which is different from each other associated with the corresponding signal waveform data; (m) determining the minimum one of the plurality of squared differences calculated in step (l); and (n) summing the minimum squared differences determined in step (m) for each of the signal waveform data.

Other objects and attainments together with a fuller understanding of the inventing will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The embodiments of the present invention are now discussed. The following embodiments are presented as illustrative and are not intended to limit the scope of the present invention. Changes and modifications of the following embodiments obvious to those skilled in the art fall within the scope of the present invention.

First Embodiment

Figure 1:
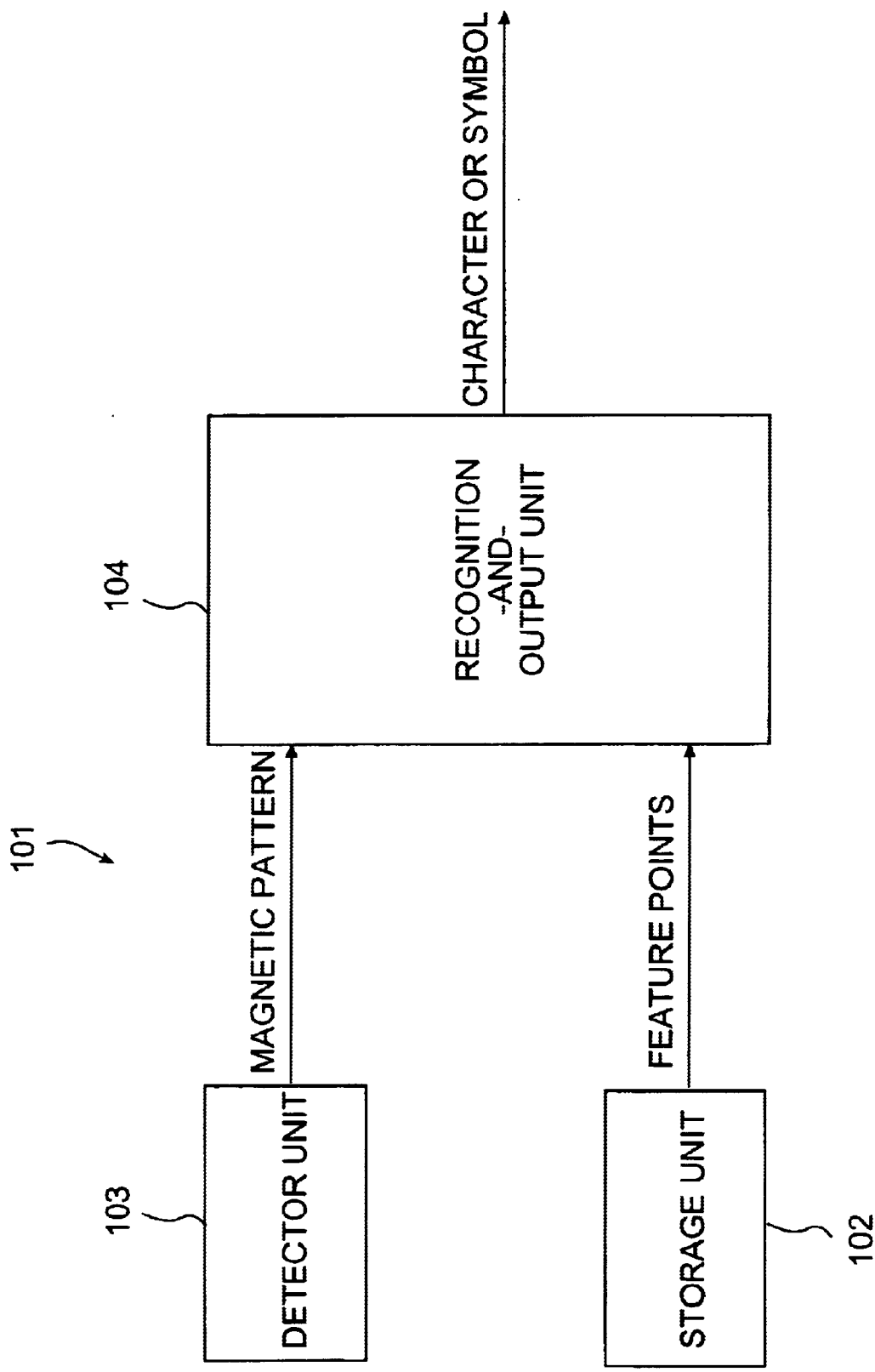
FIG. 1 is a block diagram showing a magnetic pattern recognition apparatus of an embodiment of the present invention.

FIG. 1 is a block diagram showing the general construction of a magnetic pattern recognition apparatus of an embodiment of the present invention.

A recognition apparatus 101 includes a storage unit 102, a detector unit 103, and a recognition-and-output unit 104.

The storage unit 102 stores a theoretical changes in magnetic flux at the position corresponding to each of a plurality of featured points set for each of a plurality of characters or symbols.

The detector unit 103 scans a magnetic pattern printed with magnetic ink at a predetermined speed, thereby detecting a changes in the magnetic flux.

The recognition-and-output unit 104 compares the detected magnetic flux changes with the theoretical magnetic flux changes at the position corresponding to each of the plurality of the featured points stored in the storage unit 102, recognizes, in accordance with the comparison result, a character or a symbol that satisfies a predetermined condition, and outputs code of the recognized character or symbol as a recognition result.

Figure 2:
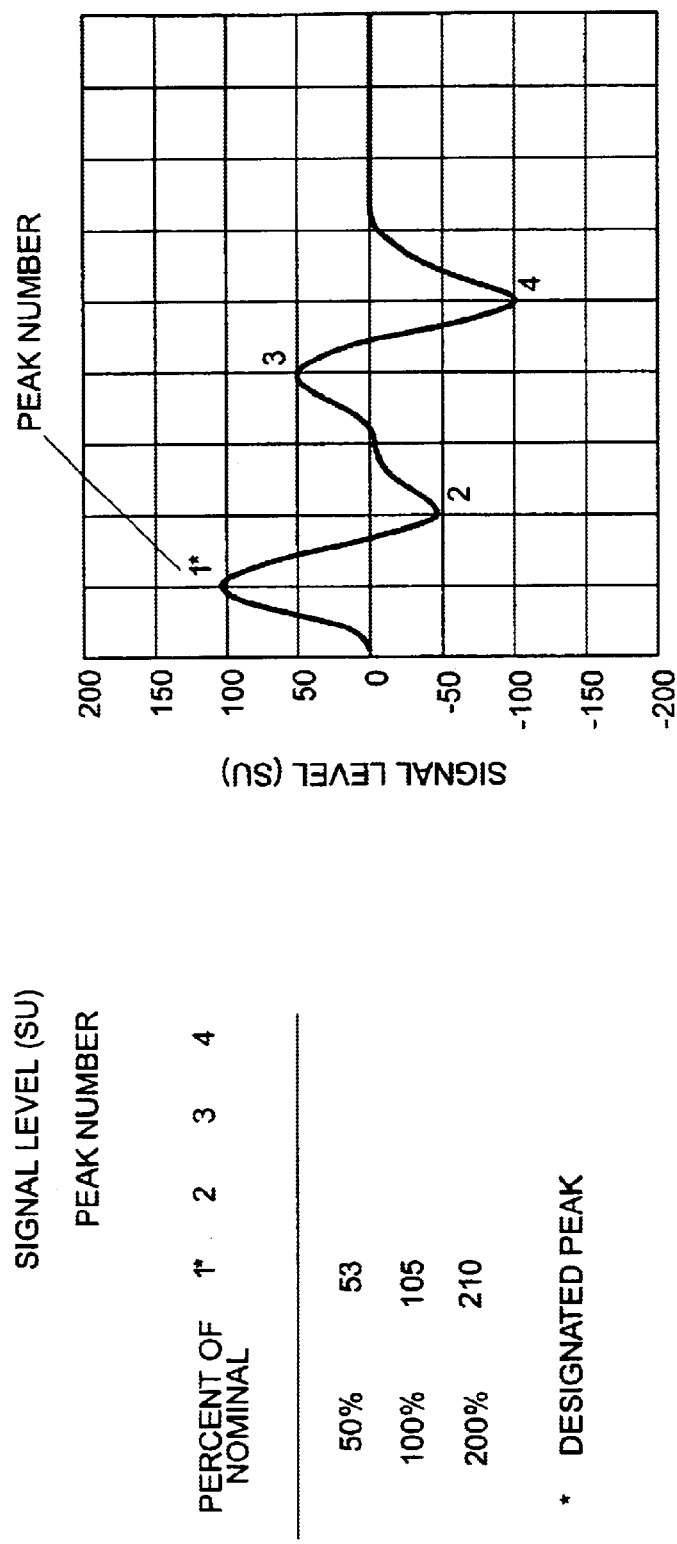
FIG. 2 is a view explaining a theoretical magnetic pattern used in the magnetic pattern recognition apparatus of an embodiment of the present invention.

FIG. 2 shows ah example of a theoretical curve in magnetic flux changes standardized in the above mentioned specifications when the magnetic pattern of the MICR characters is read by an ideal magnetic head. The waveform diagram shown in FIG. 2 is a theoretical waveform for the character "2". According to the E13B Specification, the widths of the MICR characters are divided into four groups ranging from 1.312 mm to 2.311 mm.

To scan a sheet of paper having an MICR character printed thereon, the detector unit 103 of the recognition apparatus 101 moves by step of $1/144$ inch, and acquires the magnetic flux changes fifteen times per step. The recognition apparatus 101 calculates the average of detected magnetic flux changes every four consecutive times, and temporarily stores the average as a single piece of data in a storage device such as a RAM (Random Access Memory). From the scanning speed and frequency of the data acquisition, the detector unit 103 scans by 2 mm to acquire about 49 pieces of data, which roughly correspond to the width of one MICR character. In view of the character spacing and variation in the width of the character, 70 pieces of data are handled as one-character data for recognition.

Among the 70 pieces of data in this embodiment, the fourth piece, the eleventh piece, the eighteenth piece, the (7i-3)th piece (i is a natural number), . . . , the sixtieth piece, and the sixty-seventh piece of data are defined as featured points. The theoretical magnetic flux changes at these positions are stored in the storage unit 102 such as a ROM (Read Only Memory). Specifically, reference values of magnetic flux changes at ten positions at each character are previously stored in the storage unit 102.

The E13B Specification defines fourteen types of MICR characters, from a stroke 0 through a stroke 13. In this embodiment, therefore, a total of 140 reference values are stored in the storage unit 102.

Figure 3:
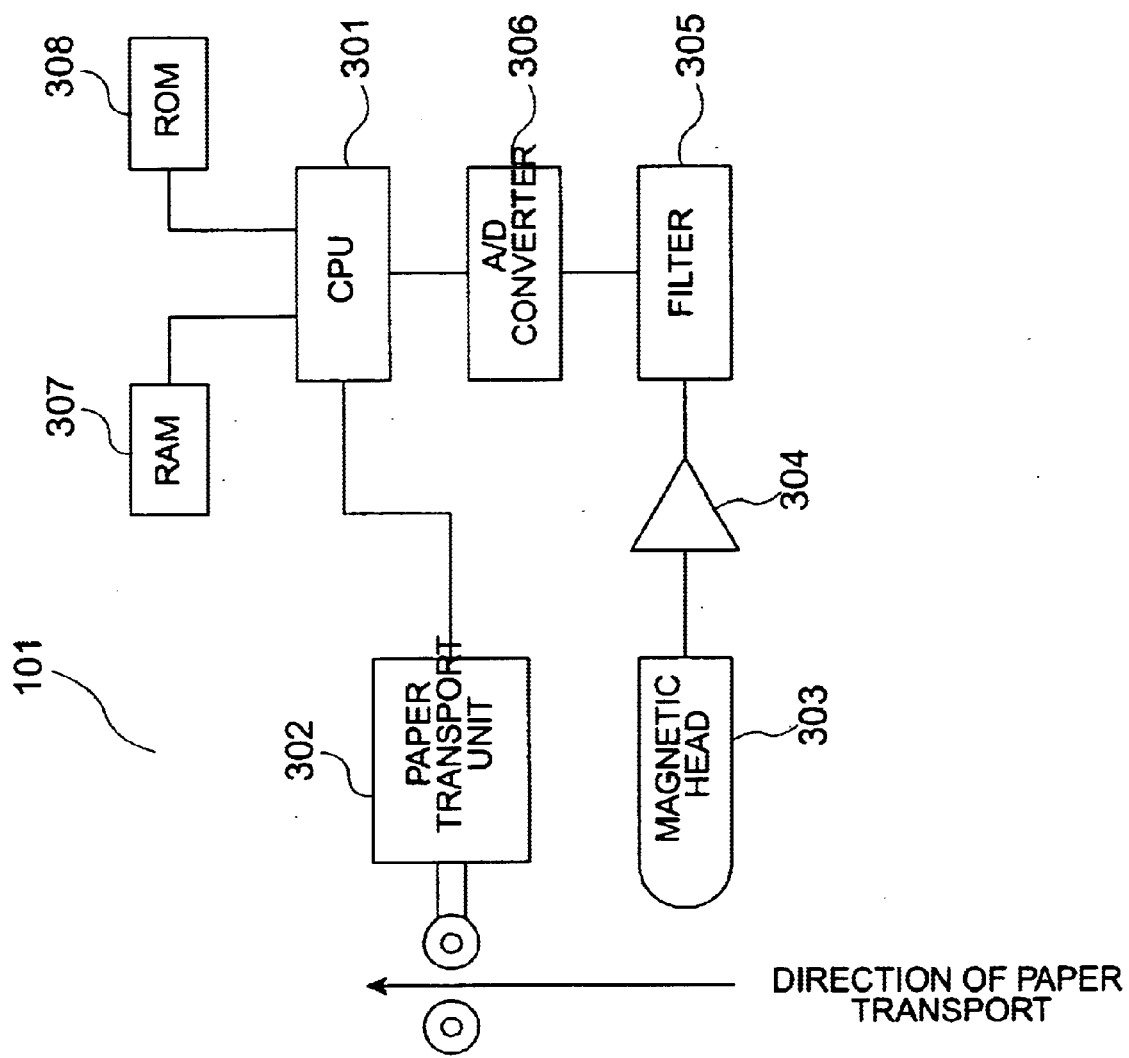
FIG. 3 is a block diagram showing one embodiment of the magnetic pattern recognition apparatus of the present invention.

FIG. 3 is a block diagram showing the hardware configuration for implementing the above embodiment of the recognition apparatus shown in FIG. 1.

A CPU 301 controls each unit in the recognition apparatus 101. A paper transport unit 302 relatively moves with respect to a magnetic head 303 a recording medium having MICR characters printed thereon such as a personal check.

A signal responsive to a change in the magnetic flux read by the magnetic head 303 is amplified by an amplifier 304 such as an operational amplifier, and is then input to a filter 305 to remove noise therefrom. An A/D (Analog to Digital) converter 306 converts the analog signal representing the magnetic flux change into a digital value which is then sent to the CPU 301 via the data bus. The digital value, received by the CPU 301 is stored in a RAM 307.

As discussed above, the paper transport unit 302 transports the sheet by step of 1/144 inch, and the magnetic head 303 detects a change in the magnetic flux fifteen times per step, and the average value of flux changes at four consecutive detection points is calculated by the CPU 301 and then stored in the RAM 307 as a single piece of data.

The theoretical magnetic flux changes at positions corresponding to the above mentioned featured points are previously stored in the ROM 308. In this embodiment, the ROM 308 stores reference values of magnetic flux changes at ten positions of each of the fourteen MICR characters.

The CPU 301 sends a drive signal to the paper transport unit 302, detects the magnetic flux changes by means of the magnetic head 303 and circuits associated therewith, stores the digital values in response to the detected magnetic flux changes into the RAM 307, compares the data stored in the RAM 307 with the theoretical magnetic pattern data stored in the ROM 308 in accordance with a method (discussed below) of recognizing a character or a symbol.

A code or a number corresponding to the recognized character or symbol is stored in the RAM 307, or is sent to a host apparatus to which the recognition apparatus is connected for further processing. For instance, if a bank account is printed in the check using MICR characters, the recognized characters and symbols are sent to the bank to check whether or the bank has issued the check. And, if the result is positive, the transaction is completed. Descriptions of other samples of processing are omitted here.

The ROM 308 functions as the storage unit 102, the magnetic head 303 functions as the detector unit 103, and the CPU 301 functions as the recognition-and-output unit 104.

The ROM 308 stores a control program executed by the CPU 301, and in this case, the ROM 308 functions as an information storage medium.

If the ROM 308 can be updated from outside such as EEPROM, the information storage medium of the present invention includes sources of the contents to be stored in the EEPROM, e.g., a CD-ROM (Compact Disc ROM), a floppy disk, a hard disk, a magneto-optical disc, a digital video disc, a magnetic tape, or semiconductor memory each storing an updated program.

Figure 4:
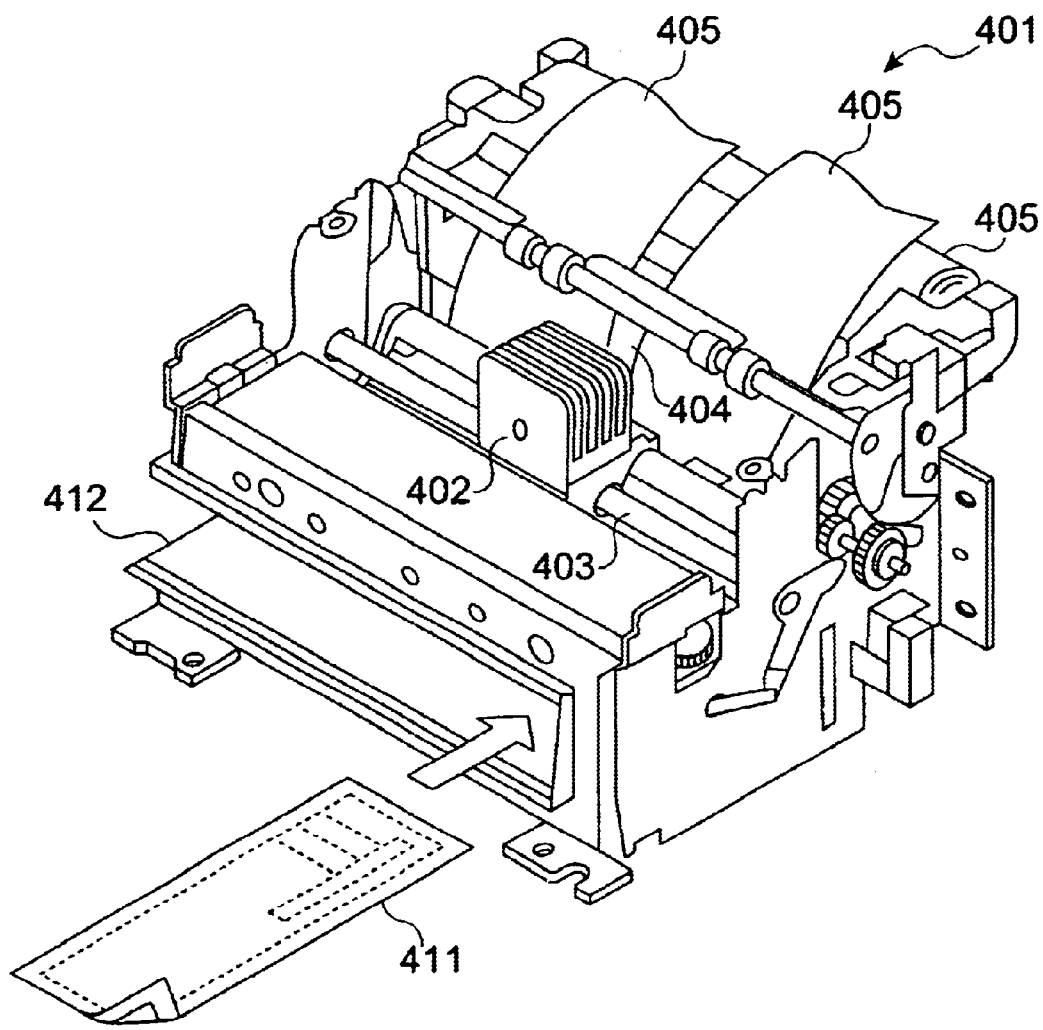
FIG. 4 is an external perspective view of a processing system in which the magnetic pattern recognition apparatus of an embodiment of the present invention and a printer are integrated.

FIG. 4 is an external view of a processing system in which the present embodiment of the magnetic pattern recognition apparatus shown in FIG. 1 and a printer are integrated.

The printer of an integrated processing system 401 includes a print head 402 for printing characters and symbols and even any images configured by dot-matrix, a support shaft 403 along which the print head 402 moves, and a platen 404 opposing the print head 402 for supporting paper during printing, and printing is performed on roll of paper 405 and slip paper such as a personal check 411 in accordance with paper selection commanded by a host device. When the integrated processing system is constructed of the recognition apparatus 101 of the present embodiment and the printer, a recording medium transport mechanism of the printer is also used as the paper transport unit 302 of the recognition apparatus 101. A control circuit such as a CPU for controlling each unit in the printer is also used as a control circuit for the recognition apparatus 101.

The recording medium having MICR characters printed thereon such as a personal check 411 is inserted into an entry slot 412, and is then processed by the recognition apparatus 101 housed in the integrated processing system 401.

Figure 5:
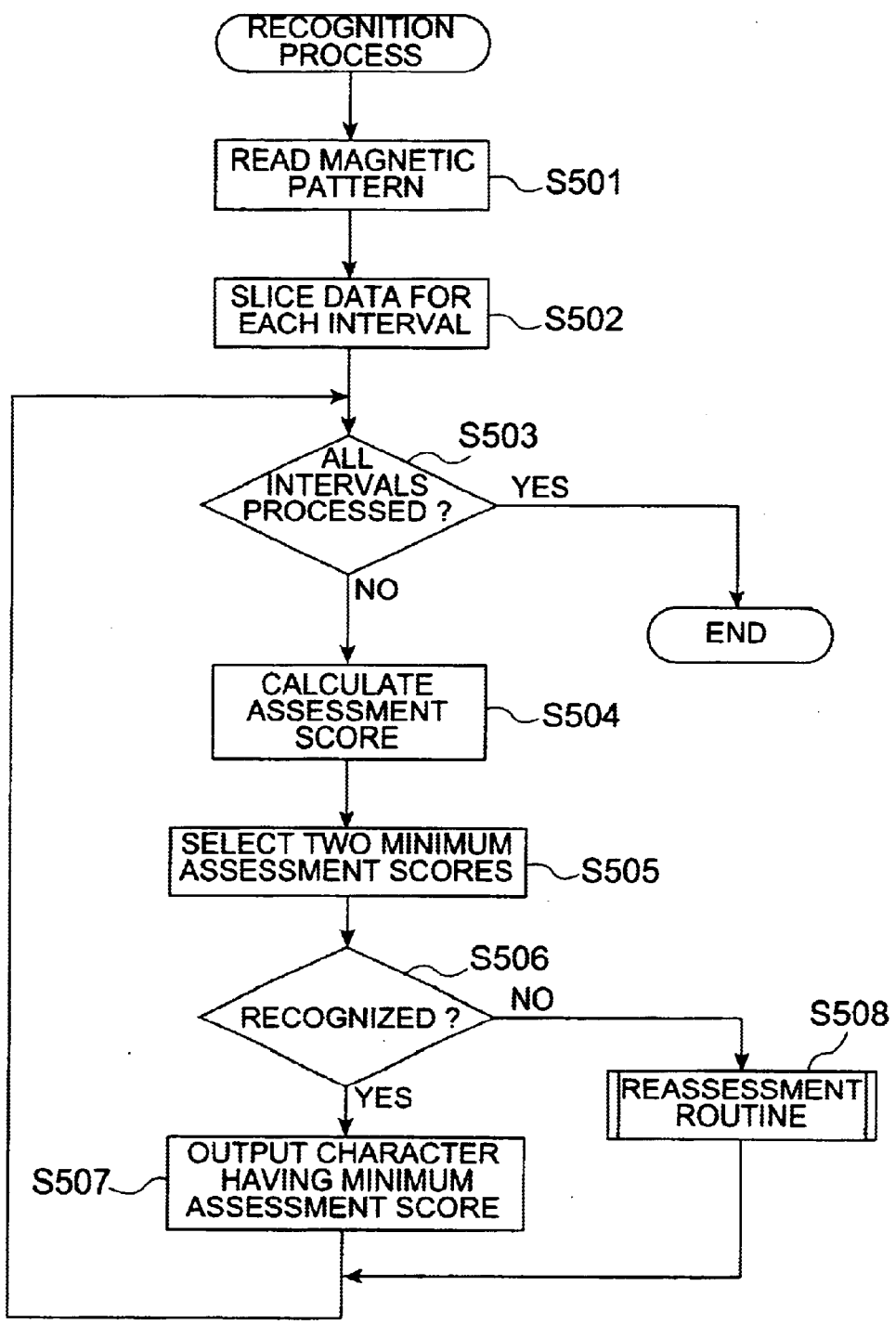
FIG. 5 is a flow chart showing the control flow of recognition processing carried out by the magnetic pattern recognition apparatus of an embodiment of the present invention.

FIG. 5 is a flow chart showing the recognition processing executed in the present embodiment of the recognition apparatus shown in FIG. 1. The recognition processing starts in response to the insertion of the personal check 411. In the present embodiment, a photo-sensor such as a photo-interrupter is used to detect the insertion of the personal check 411. In another embodiment, the user may issue an instruction to CPU 301 to alert the CPU 301 to the insertion of the personal check 411. In the integrated processing system 401 of the present embodiment, the insertion of the personal check 411 is detected by a slip sheet detector of the printer, which is used to detect the insertion of a slip sheet inserted into the printer.

CPU 301 sends drive signals to a driver (not shown) to drive the paper transport unit 302 while operating the magnetic head 303 to read the magnetic pattern printed on the personal check 411, and then stores the read data into the RAM 307 (step S501) as explained in detail above.

In succession, the CPU 301 extracts from the read data (step S502) the data which is considered to correspond to each character, using such method as disclosed in Japanese Laid-open Patent Publication No. 9-311906. In the present embodiment, 70 data are extracted in each duration of character.

In step S502, the data may be normalized. For instance, a single piece of data is stored in one byte, namely, it represents 256 levels. If the change in the magnetic flux is zero, a value stored is 128. Seventy data are converted in a following manner. The values stored are distributed in the range of 129 to 254 when the magnetic flux increases, namely, the change in the magnetic flux is positive, and the values stored are distributed in the range of 2 to 127 when the magnetic flux decreases, namely, the change in the magnetic flux is negative. The theoretical magnetic pattern to be stored in the ROM 308 is also normalized in the same manner. In this embodiment, the conversion is performed in this way, but the present invention is not limited thereto. The conversion may be performed so that a negative number is expressed using the complement of "2".

The CPU 301 repeats steps S504 through S508 for the duration of each character or symbol (step S503).

The CPU 301 determines assessment scores by comparing the magnetic pattern of each of the fourteen characters stored in the ROM 308 with the detected data including the 70 data in each duration (step S504). The assessment score will be detailed later.

The minimum assessment score and the second smallest assessment score are then selected (step S505).

A determination is made of whether the minimum assessment score is sufficiently small and whether the second smallest assessment score is sufficiently large (step S506). If the answer is affirmative (Yes in step S506), a character corresponding to the minimum assessment score is output as a recognition result (step S507).

If the answer is not affirmative (No in step S506), a report of an unsuccessful recognition is made (step S508). Alternatively, a reassessment routine in accordance with one of a second embodiment and a third embodiment described below is performed.

The method of determining the assessment score is now discussed. For simplicity, let d[1], d[2], ..., d[70] represent the 70 pieces of data in a single duration, and s[1], s[2], ..., s[10] represent the values of the featured points of a magnetic pattern corresponding to a character or symbol. The assessment score for this character is calculated by the following equation (1).

$$x = \sum_{i=1}^{10} |s[i] - d[7i-3]|^2 \qquad (1)$$

The sum of squared differences is used because it has no sign associated therewith and requires no consideration of the sign. Furthermore, by emphasizing the difference from the reference data, the assessment score is weighted so that a character giving small differences on all featured points on the average is selected, whereas a character giving a large difference at one featured point and a small difference at the others is not selected.

Experiments show that the assessment score derived from the sum of the squared differences results in a good recognition rate in recognizing the MICR characters subject to variations in the shapes thereof printed by printers having different recording densities.

The character having the minimum assessment score may be selected as the recognition result when the character having the minimum assessment score is smaller than a predetermined first threshold and when the character having the second smallest assessment score is larger than a predetermined second threshold.

The first and second thresholds may be experimentally determined. The second threshold may be set to be twice as large as the first threshold.

Second Embodiment

The second embodiment is largely identical to the first embodiment, and the difference therebetween lies in the manner of calculation of the assessment score. The second embodiment is useful when the read magnetic data is generally shifted. For instance, the routine of the second embodiment may be used in step S508 in the first embodiment.

An assessment score y in the second embodiment is calculated using equation (2).

$$y = \min \begin{pmatrix} \sum_{i=1}^{10} |s[i] - d[7i-5]|^2 \\ \sum_{i=1}^{10} |s[i] - d[7i-4]|^2 \\ \sum_{i=1}^{10} |s[i] - d[7i-3]|^2 \\ \sum_{i=1}^{10} |s[i] - d[7i-2]|^2 \\ \sum_{i=1}^{10} |s[i] - d[7i-1]|^2 \end{pmatrix} \qquad (2)$$

Equation (2) means that a minimum value is selected as the assessment score from within five values, namely, the center value, i.e., a value of interest, four values calculated using shifted data, e.g., two positions ahead, one position ahead, two positions behind, one position behind. By using the present embodiment even if the read data is shifted by two positions, the character recognition is successfully performed.

The thresholds may be applied to the assessment scores in the same way as in the first embodiment to recognize the characters or symbols.

Third Embodiment

The third embodiment is largely identical to the first embodiment, and the difference therebetween lies in the manner of calculation of the assessment score. The third embodiment is useful when the read magnetic data is partly shifted. For instance, the routine of the third embodiment may replace step S508 in the first embodiment.

An assessment score z in the third embodiment is calculated using equation (3).

$$z = \sum_{i=1}^{10} \min \begin{pmatrix} |s[i] - d[7i-4]|^2 \\ |s[i] - d[7i-3]|^2 \\ |s[i] - d[7i-2]|^2 \end{pmatrix} \qquad (3)$$

Equation (3) means that a minimum value of square differences calculated using data around the featured point is determined for each featured point and then the assessment score is calculated by accumulating the minimum square differences. Even if the read data is partially shifted due to, for example, flatter of a transportation motor, character recognition is performed successfully by using the present embodiment.

The thresholds may also be applied to the assessment scores in the same way as in the first embodiment to recognize the characters and symbols.

The assessment scores x, y, and z may be used alone or in combination. The range of tolerable shift may be appropriately set in the calculation of the assessment scores y and z. The combination of these methods improves the recognition accuracy.

Fourth Embodiment

The featured points are selected having a regular distance in each character in the first to third embodiments. Each of the MICR characters has a point that provides a unique distribution of magnetic flux changes. For instance, the featured points may be set at a maximum magnetic flux changes point, a minimum magnetic flux changes point, a zero-crossing point, and a point of inflection, and the sum of squared differences may be calculated by comparing the values at each of these featured points.

Figure 6A:
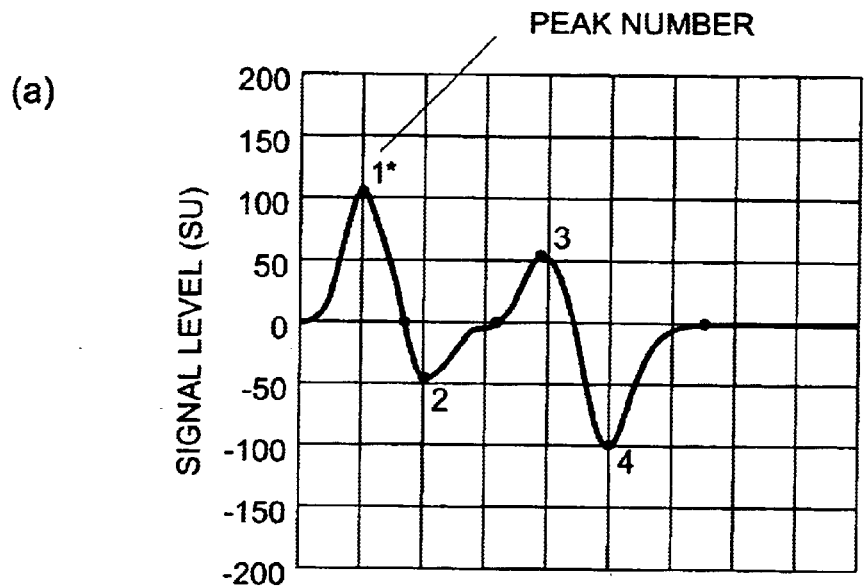
FIGS. 6A and 6B show the magnetic patterns and featured points used by the magnetic pattern recognition apparatus of an embodiment of the present invention during pattern recognition.
Figure 6B:
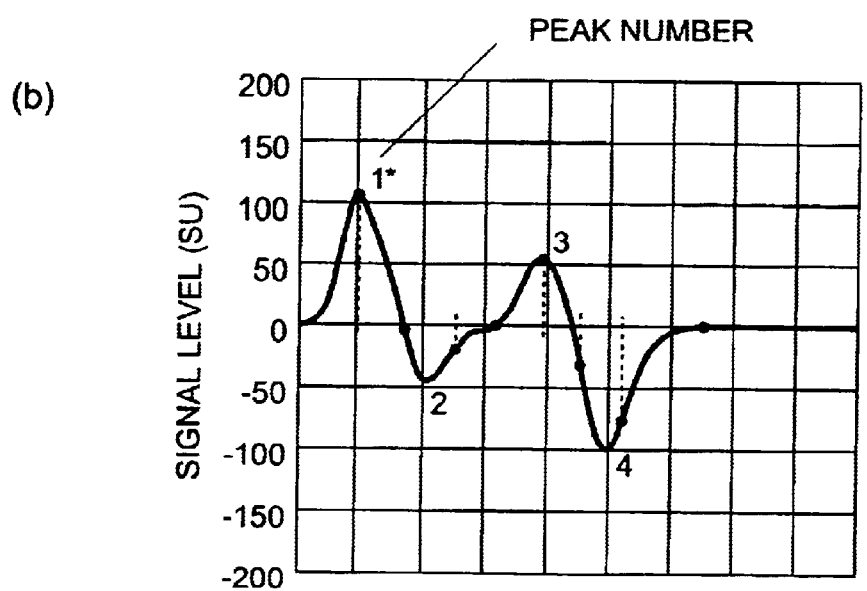
Figure 7:
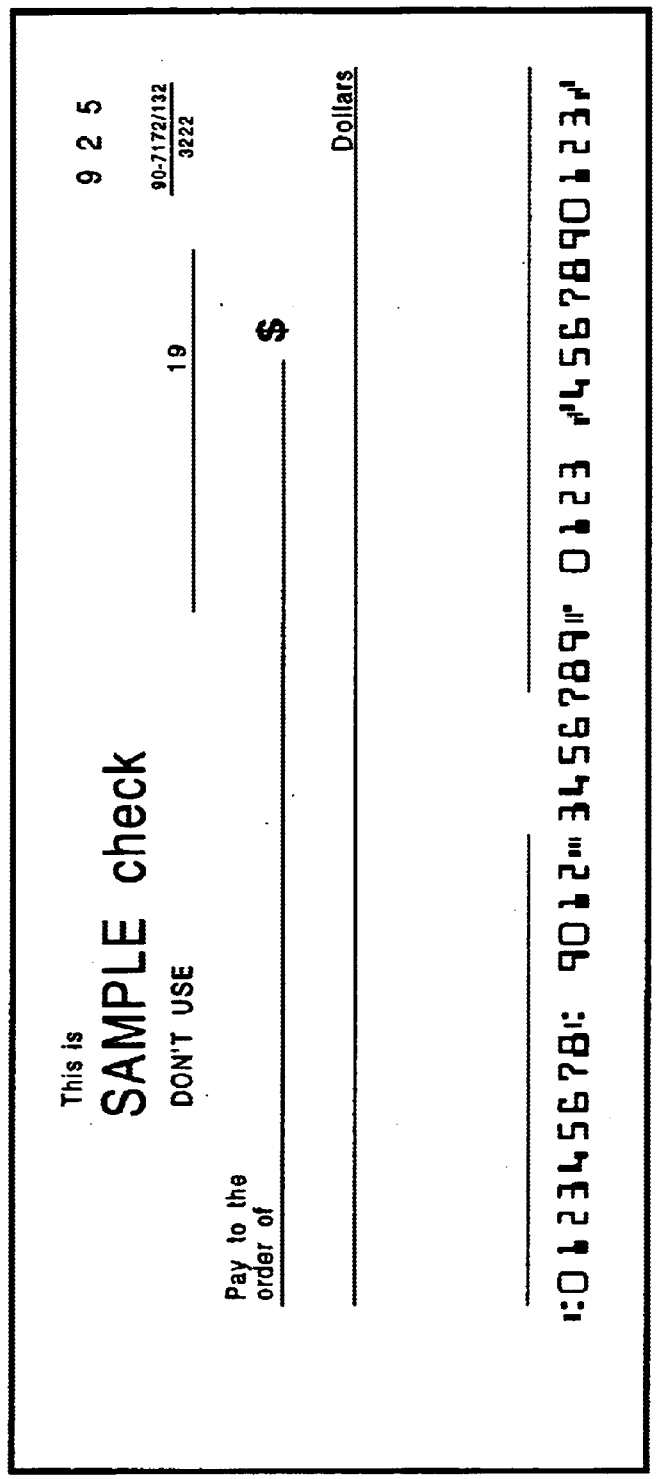
FIG. 7 is an explanatory view showing a personal check with MICR characters printed.

FIGS. 6A and 6B show the featured points for comparison. The magnetic pattern shown in the graphs in FIGS. 6A and 6B is for the character "2". In the graphs, the magnetic flux change values at the featured points are represented by solid dots.

FIG. 6A shows the positions of the featured points in the fourth embodiment. The featured points are set at the maximum points, the minimum points, and the zero-crossing points.

In contrast, FIG. 6B shows the positions of the ten featured points in the first to third embodiments. The featured points are equally spaced.

In each of the MICR characters, a total number of maximum points, minimum points, and zero-crossing points is typically smaller than ten. Compared with the preceding embodiments, the memory saving rate of the fourth embodiment is high. Furthermore, the fourth embodiment results in a reduced amount of calculation required for character recognition.

The fourth embodiment also implements the method of determining the minimum value of the sums of the squared differences on the assumption that the magnetic data is shifted forward or backward (as described in connection with the second embodiment), or the method of determining the minimum value of the sums of the squared differences prior to and subsequent to the featured point (as described in connection with the third embodiment). The fourth embodiment may be used in combination with these methods or in combination with the preceding embodiments. Specifically, when the assessment score fails to pass the threshold test in the recognition method of the fourth embodiment, the assessment score is tested through the methods of the combination of the fourth and second embodiments, the combination of the fourth and third embodiments, the first embodiment, the combination of the first and second embodiments, and the combination of the first and third embodiments until the assessment score passes any of these threshold tests thereof.

The above embodiments adopt the sum of the squared differences. Alternatively, the sum of the absolute values of the differences, or the sum of a power of the absolute values of the differences may be utilized. The use of the sum of the absolute values of the differences reduces the amount of calculation for recognition.

As discussed above, the present invention provides the magnetic pattern recognition apparatus and method for providing a high recognition rate for MICR characters printed on a diversity of printers having different recording densities and subject to variations. The present invention also provides a computer-readable information storage medium that stores a program for carrying out character recognition.

In particular, the present invention provides the magnetic pattern recognition apparatus and method, suitable for recognizing MICR characters that are printed using magnetic ink at a various different accuracy levels, and the computer-readable information storage medium which stores the program that performs character recognition.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A print pattern recognition apparatus comprising:
   a storage that stores a set of reference signal data extracted according to a predetermined condition for each of a plurality of reference signal waveforms corresponding to respective characters, each set of stored reference signal data being identified with its corresponding character;
   a detector that reads print patterns printed on a recording medium and outputs a set of read signal data for each read print pattern;
   a comparator that compares each read print pattern with at least one character by
      respectively calculating n squared difference values between (i) a respective one of the reference signal data associated with the at least one character and (ii) each of n read signal data from the set of read signal data associated with that read print pattern, where n is an integer greater than or equal to 3,
      determining, among the n squared difference values, a minimum squared difference value, and
      summing the minimum squared differences determined for that read print pattern with respect to the at least one character to calculate an assessment score indicative of how well that read print pattern compares with the at least one character; and
   a recognition unit that recognizes each of the read print patterns printed on the recording medium in accordance with a comparison result provided by the comparator.

2. A print pattern recognition apparatus according to claim 1, wherein the recognition unit identifies each read print pattern as corresponding to the reference signal waveform for which its corresponding assessment score is minimum.

3. A print pattern recognition apparatus according to claim 2, wherein the comparator comprises a data shifter that, for each set of read signal data, shifts that set of read signal data to facilitate calculating the n squared difference values between (i) a respective one of the reference signal data associated with the at least one character and (ii) the n read signal data from that set of read signal data.

4. A print pattern recognition apparatus according to claim 3, wherein the comparator further comprises a minimum assessment score detector that, for each set of read signal data, determines the minimum one of a plurality of assessment scores respectively representative of the comparisons of that set of read signal data with a plurality of sets of reference signal data, and outputs the determined minimum assessment score for that set of read signal data.

5. A print pattern recognition apparatus according to claim 1, wherein the predetermined condition, according to which each set of reference signal data is extracted from its corresponding reference signal waveform, includes at least one of a maximum point, a minimum point, and a zero-crossing point.

6. A print pattern recognition apparatus according to claim 1, wherein the respective characters are defined by one of a CMC7 Specification and a E13B Specification.

7. A method of recognizing a print pattern comprising the steps of:
   (a) reading print patterns printed on a recording medium and outputting a set of read signal data for each read print pattern;

(b) retrieving at least one set of reference signal data extracted according to a predetermined condition from a corresponding reference signal waveform that corresponds to a character;

(c) comparing each read print pattern with the at least one character by calculating n squared difference values between (i) a respective one of the reference signal data associated with the at least one character and (ii) each of n read signal data from the set of read signal data associated with that read print pattern, where n is an integer greater than or equal to 3, determining, among the n squared difference values, a minimum squared difference value, and summing the minimum squared differences determined for that read print pattern with respect to the at least one character to calculate an assessment score indicative of how well that read print pattern compares with the at least one character; and (d) recognizing the each of the read print patterns printed on the recording medium in accordance with a comparison result provided in step (c).

8. A method according to claim 7, wherein step (d) further comprises identifying each read print pattern as corresponding to the reference signal waveform for which its corresponding-assessment score is minimum.

9. A method according to claim 8, wherein step (c) further comprises, for each set of read signal data, shifting that set of read signal data to facilitate calculating the n squared difference values between (i) a respective one of the reference signal data associated with the at least one character and (ii) the n read signal data from that set of read signal data.

10. A method according to claim 9, wherein step (c) further comprises, for each set of read signal data, determining the minimum one of a plurality of assessment scores respectively representative of the comparisons of that set of read signal data with a plurality of sets of reference signal data, and outputting the determined minimum assessment score for that set of read signal data.

11. A method according to claim 7, wherein the predetermined condition, according to which each set of reference signal data is extracted from its corresponding reference signal waveform, includes at least one of a maximum point, a minimum point, and a zero-crossing point.

12. A method according to claim 7, wherein the respective characters are defined by one of a CMC7 Specification and a E13B Specification.

13. A computer-readable medium embodying a program of instructions executable by a computer to perform a method of recognizing a print pattern, the program of instructions comprising-instructions for:

(a) reading print patterns printed on a recording medium outputting a set of read signal data for each read print pattern;

(b) retrieving at least one set of reference signal data extracted according to a predetermined condition from a corresponding reference signal waveform that corresponds to a character;

(c) comparing each read print pattern with the at least one character by calculating n squared difference values between (i) a respective one of the reference signal data associated with the at least one character and (ii) each of n read signal data from the set of read signal data associated with that read print pattern, where n is an integer greater than or equal to 3, determining, among the n squared difference values, a minimum squared difference value, and summing the minimum squared differences determined for that read print pattern with respect to the at least one character to calculate an assessment score indicative of how well that read print pattern compares with the at least one character; and (d) recognizing the each of the read print patterns printed on the recording medium in accordance with a comparison result provided in step (c).

14. A computer-readable medium according to claim 13, wherein instructions (d) further comprises identifying each read print pattern as corresponding to the reference signal waveform for which its corresponding assessment score is minimum.

15. A computer-readable medium according to claim 14, wherein instructions (c) further comprises, for each set of read signal data, shifting that set of read signal data to facilitate calculating the n squared difference values between (i) a respective one of the reference signal data associated with the at least one character and (ii) the n read signal data from that set of read signal data.

16. A computer-readable medium according to claim 15, wherein instructions (c) further comprises, for each set of read signal data, determining the minimum one of a plurality of assessment scores respectively representative of the comparisons of that set of read signal data with a plurality of sets of reference signal data, and outputting the determined minimum assessment score for that set of read signal data.

17. A computer-readable medium according to claim 13, wherein the predetermined condition, according to which each set of reference signal data is extracted from its corresponding reference signal waveform, includes at least one of a maximum point, a minimum point, and a zero-crossing point.

18. A computer-readable medium according to claim 13, wherein the respective characters are defined by one of a CMC7 Specification and a E13B Specification.

* * * * *